US011904623B2

(12) United States Patent
Pearson

(10) Patent No.: US 11,904,623 B2
(45) Date of Patent: Feb. 20, 2024

(54) SECURE IDENTITY DOCUMENT AND METHODS OF MANUFACTURING THE SAME

(71) Applicant: ASSA ABLOY AB, Stockholm (SE)

(72) Inventor: Joseph Bernard Pearson, Cedar Park, TX (US)

(73) Assignee: ASSA ABLOY AB, Stockholm (SE)

( * ) Notice: Subject to any disclaimer, the term of this patent is extended or adjusted under 35 U.S.C. 154(b) by 139 days.

(21) Appl. No.: 17/250,950

(22) PCT Filed: Oct. 15, 2019

(86) PCT No.: PCT/EP2019/078000
§ 371 (c)(1),
(2) Date: Apr. 1, 2021

(87) PCT Pub. No.: WO2020/079018
PCT Pub. Date: Apr. 23, 2020

(65) Prior Publication Data

US 2022/0009268 A1 Jan. 13, 2022

Related U.S. Application Data

(60) Provisional application No. 62/834,741, filed on Apr. 16, 2019, provisional application No. 62/746,314, filed on Oct. 16, 2018.

(51) Int. Cl.
*B42D 25/346* (2014.01)
*B42D 25/23* (2014.01)
*B42D 25/309* (2014.01)

(52) U.S. Cl.
CPC ........... *B42D 25/346* (2014.10); *B42D 25/23* (2014.10); *B42D 25/309* (2014.10)

(58) Field of Classification Search
CPC ..... B42D 25/346; B42D 25/23; B42D 25/309
USPC ...... 283/67, 70, 72, 74, 75, 77, 94, 98, 100, 283/105
See application file for complete search history.

(56) References Cited

U.S. PATENT DOCUMENTS 4,313,984 A * 2/1982 Moraw .................. B42D 25/00 428/140
2008/0169638 A1* 7/2008 Beyer-Meklenburg ...................... B42D 25/47 281/38
2016/0176219 A1* 6/2016 Nijssen .................. B42D 25/41 283/77

FOREIGN PATENT DOCUMENTS

DE 102017000124 A1 7/2018
EP 0013418 A1 7/1980
(Continued)

OTHER PUBLICATIONS

"International Application Serial No. PCT/EP2019/078000, International Search Report dated Jan. 17, 2020", 4 pgs.
(Continued)

*Primary Examiner* — Justin V Lewis
(74) *Attorney, Agent, or Firm* — Schwegman Lundberg & Woessner, P.A.

(57) ABSTRACT

A security document is disclosed to include an image area provided on a front side of the document that includes image content, an information area provided on the front side that includes informational content, and a security feature including a pattern of perforations provided in an overlapping relationship with the image area and the information area so as to simultaneously bind and secure the image content with the informational content.

17 Claims, 11 Drawing Sheets

(56) References Cited

FOREIGN PATENT DOCUMENTS

| | | | |
|---|---|---|---|
| EP | 1997643 | A2 | 12/2008 |
| WO | WO-2020079018 | A1 | 4/2020 |

OTHER PUBLICATIONS

"International Application Serial No. PCT/EP2019/078000, Written Opinion dated Jan. 17, 2020", 6 pgs.
"International Application Serial No. PCT/EP2019/078000, International Preliminary Report on Patentability dated Apr. 29, 21", 8 pgs.
"European Application Serial No. 19789945.3, Communication Pursuant to Article 94(3) EPC dated Jul. 7, 2023", 5 pgs.

* cited by examiner

SECURE IDENTITY DOCUMENT AND METHODS OF MANUFACTURING THE SAME

CROSS-REFERENCE TO RELATED APPLICATION(S)

The present application is a national stage application under 35 U.S.C. § 371 of PCT Appl. No. PCT/EP2019/078000, filed Oct. 15, 2019, which claims the benefit of U.S. Provisional Pat. Appl. No. 62/834,741, filed Apr. 16, 2019, and U.S. Provisional Pat. Appl. No. 62/746,314, filed Oct. 16, 2018, each of which is hereby incorporated herein by reference in its entirety.

FIELD

The present disclosure is generally directed to security features, security documents incorporating security features, and methods of manufacturing the same.

BACKGROUND

The use of identification documents and other credentials is pervasive. Credentials are used on a daily basis for a number of different purposes. Credentials, which may also be referred to as secure documents, are most commonly used to prove identity, verify age, access an asset (e.g., secure area, financial account, computing resource, etc.), as evidence for driving privileges, cash a check, and the like. Airplane passengers are required to show a credential during check in, during security screening, and prior to boarding their flight. We also live in an ever-evolving cashless society where credentials are used to make payments, access automated teller machines, debit an account, or make a payment, etc. Many industries require that their employees carry photo identification credentials on the job in order to access various locations on a job site.

While many different types of security features have been developed to enhance the security associated with credentials, optically variable or holographic security features have been among the most popular features developed in the last decade due to the difficulty associated with copying and the ease with which they can be verified. Although holographic features provide good security against forgery, there is a need to continue developing new types of security features, whether holographic or not. This continued development helps stay in front of potential document forgers and other bad actors.

SUMMARY

Embodiments of the present disclosure aim to overcome the shortcomings described above. In some embodiments, a secure identity document or secure document is provided with one or more forge-proof features, which may be referred to herein as a security feature. In accordance with at least some embodiments, a secure document includes a front side, a backside opposite the front side, and an image area provided on the front side that comprises image content. In accordance with some embodiments of the present invention, the secure document also includes an information area on the front side that may have informational content and a security feature. In accordance with some embodiments, the security feature includes a pattern of perforations provided in an overlapping relationship with the image area and the information area, which simultaneously binds and secures the image content with the informational content.

In a further embodiment of the present disclosure, a method of manufacturing a secure document is disclosed. In an embodiment, the method includes receiving the secure document with a front side and opposing backside and creating an image area on the front side of the secure document. In an embodiment, the method also includes creating an information area on the front side of the secure document and creating a security feature. In an embodiment, the security feature may have a pattern of perforations that overlap at least some of the image area and overlap at least some of the information area.

In another embodiment of the present invention, a forge-proof document is provided. In an embodiment, the forge-proof document includes a polycarbonate substrate and an image area that may have an image printed onto at least one side of the polycarbonate substrate. In an embodiment of the present disclosure, the forge-proof document also includes an information area comprising information that is printed adjacent to the image area and a security feature. In one embodiment, the security feature includes a pattern of perforations in the polycarbonate substrate where a first portion of the pattern of perforations overlap the image area and a second portion of the pattern of perforations overlap the information area.

In another embodiment of the present invention, an identification document comprising a first facial image and first additional information is provided. In this embodiment, the first facial image is generated with a first pattern of perforations formed in a substrate of the identification document. In an embodiment, the first additional information corresponds to a holder of the identification document and the additional information is provided as a second pattern of perforations formed in the substrate of the identification document.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate possible and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
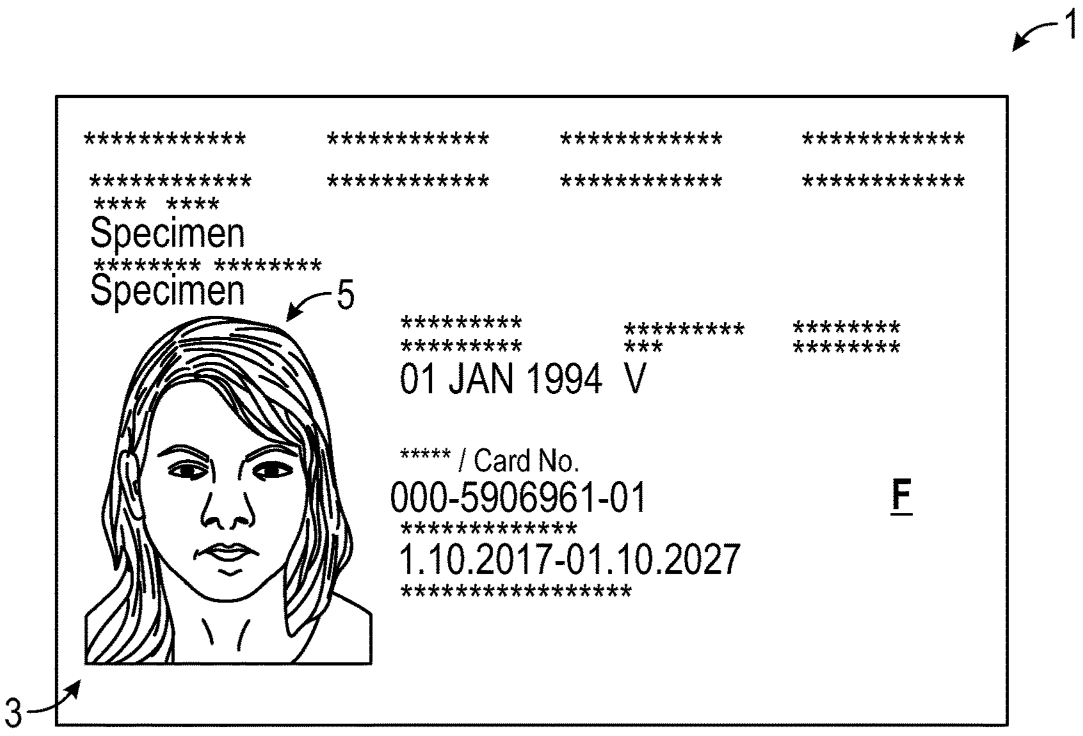
FIG. 1 shows a second security feature of a front side of an inventive forge-proof document according to the present disclosure.
Figure 2:
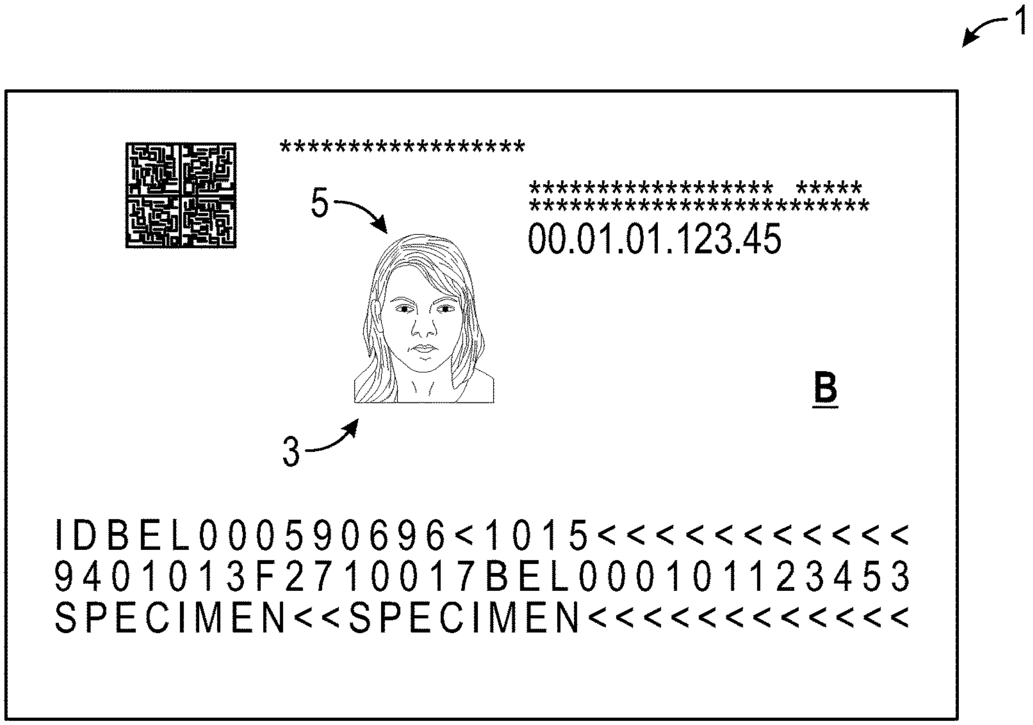
FIG. 2 shows a second security feature of a back-side of the inventive forge-proof document according to the present disclosure.
Figure 3:
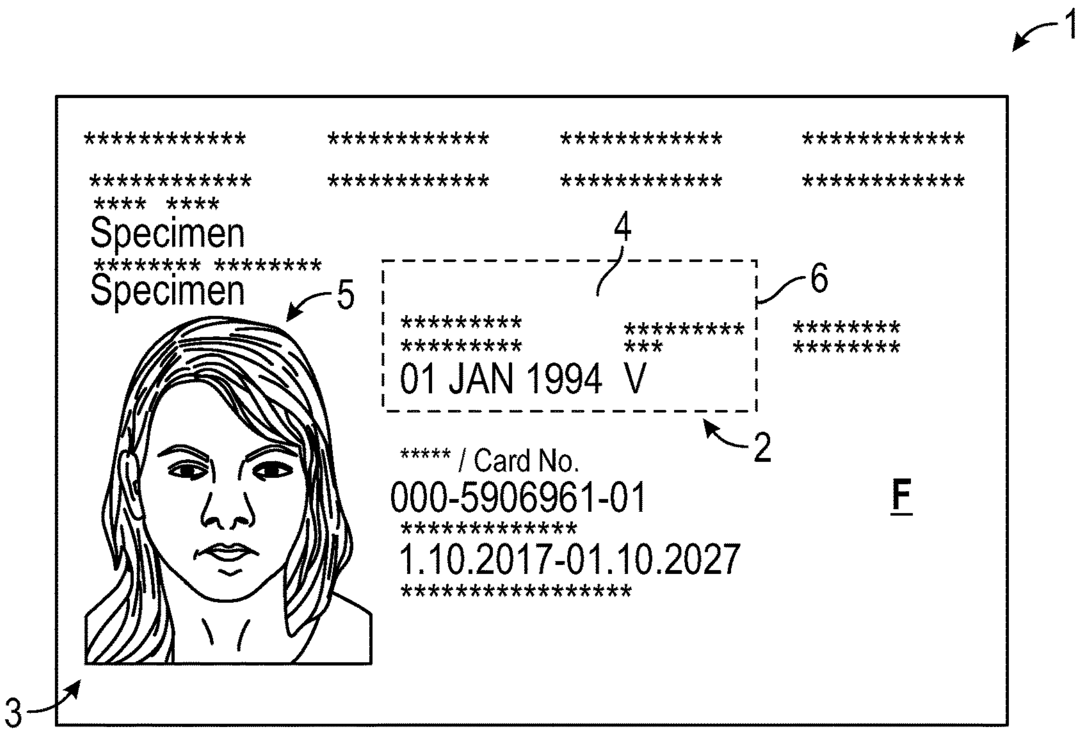
FIG. 3 shows a first and second security feature of a front side of the inventive forge-proof document against a light source according to the present disclosure.
Figure 4:
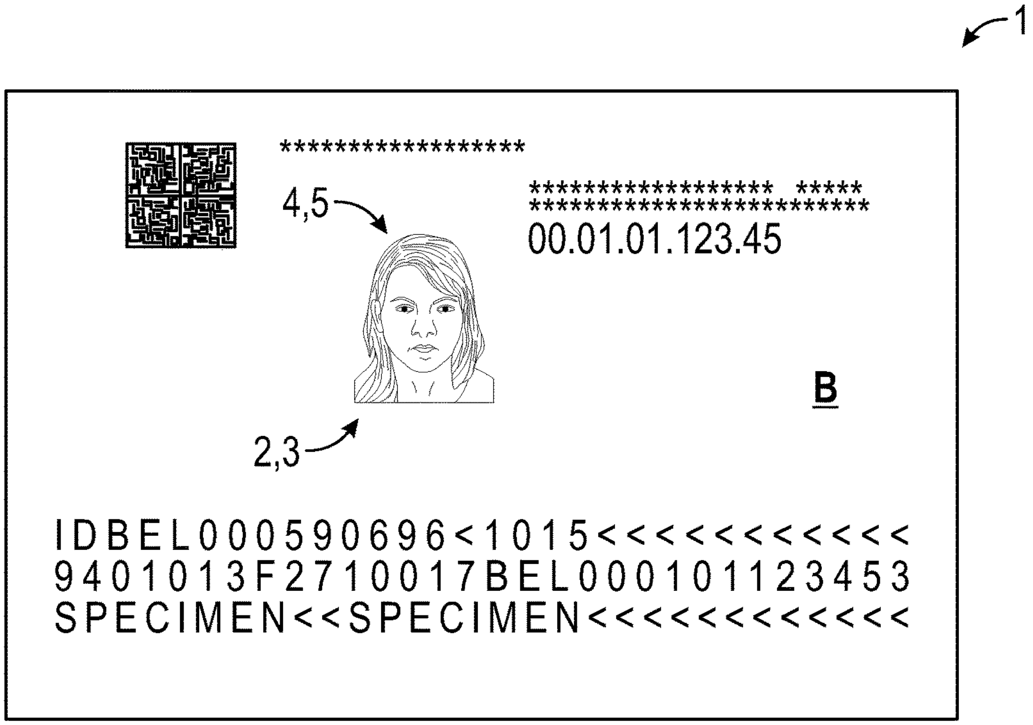
FIG. 4 shows a first and second security feature of a backside of the inventive forge-proof document against a light source according to the present disclosure.

Now referring to the Figures, FIGS. 1-5 illustrate a document 1, which, in some embodiments, may be a forge-proof document, in accordance with embodiments of the present invention. FIG. 1 shows a front side F of the document 1 while FIG. 2 illustrates a backside B of the document 1. In FIGS. 1 and 2, embodiments of the document 1 are shown where light is not shining through the document 1, e.g., a user is not holding the document 1 to a light source. FIG. 3 also shows the front side F of the document 1 and FIG. 4 shows the backside B of the document 1. In FIGS. 3 and 4, embodiments of the document 1 are shown where light is shining through the document 1, e.g., a user is holding the document 1 to a light source.

The front side F of the document 1 may include a first security feature 2 with a perforation pattern 6 that displays first image information 4 when viewed against a bright background. In other words, when the document 1 is viewed against a light source, the first security feature 2 along with the first image information 4 are visible. The document 1 also may include a second security feature 3 having second image information 5 that is displayed by reflecting light emitted thereon. In accordance with an embodiment of the present disclosure, the first image information 4 comprises information that may be similar to the second image information 5. The perforation pattern 6 may be formed using a laser. Thus, in embodiments where paper, plastic, or any type of textile may be used for the document 1, using a laser has the advantage that at the position of the perforation pattern 6, the material, such as paper, plastic or textile, that is intended to be removed may be completely removed. When the fingertips of a user brush over the document 1 at the perforation pattern 6, generally no elevation, channel, or burr, can be felt. However, if the perforation pattern 6 were applied by forgers by means of, for instance, conically formed needles, cup-shaped edges or burrs would be created and are easily discernible with the fingertips of a user. Therefore, the perforation pattern 6 provides a good means of identifying possible forgeries. In accordance with embodiments of the present disclosure, the second information 5 may be formed in the document 1 with an engraving process, ink jet printing, or laser printing.

As may be seen with references to FIGS. 1-4, each of the first security feature 2 and the second security feature 3 correspond to an image of a person. However, the first and second security features 2 and 3 are not limited to images of a person and may contain any images or any type of information. Moreover, in accordance with an embodiment of the present disclosure, each of the first security feature 2 and the second security feature 3 correspond to each other, e.g., each of the first security feature 2 and the second security feature 3 include the same image. However, in accordance with embodiments of the present disclosure, each of the first security feature 2 and the second security feature 3 correspond to different images.

Each of the front side F and the backside B include the second security feature 3 along with the first image information 4 and the second image information 5. Here, the first image information 4 and the second image information 5 on the back side B are mirrored versions of the first image information 4 and the second image information 5 on the front side F. In other words, the first image information 4 and the second image information 5 on the front side F are horizontally mirrored on the back side B. Thus, the first image information 4 on the front side F corresponds to the first image information 4 on the backside B. Similarly, the second image information 5 on the front side F corresponds to the first image information 5 on the backside B.

In accordance with embodiments of the present disclosure, a size of the second image information 5 on the front side F may be larger than a size of the second image information 5 on the backside B. In particular, in this embodiment, the size of the second image information 5 on the backside B may be the same size as the first image information 4 on the backside B. Moreover, as may be seen with reference to FIG. 4, the first security feature 2 and the second security feature 3 on the backside B correspond to the first image information 4 and the second image information 5, also on the backside B.

Similar to the front side F, the first security feature 2 and the first image information 4 on the backside B are visible when the document 1 is viewed against a bright background, such as a light source. Furthermore, as noted above, the second security feature 3 and the second image information 5 are visible when light is not shining through the document 1. However, when light is shining through the document 1, the first security feature 2, the first image information 4, the second security feature 3, and the second image information 5 appear in a lighter color than only the second security feature 3 and the second image information 5 when no light is shining through the document 1. Also, similar to the front side F, the second security feature 3 and the second image information 5 on the backside B are visible by reflecting light emitted thereon.

Figure 5:
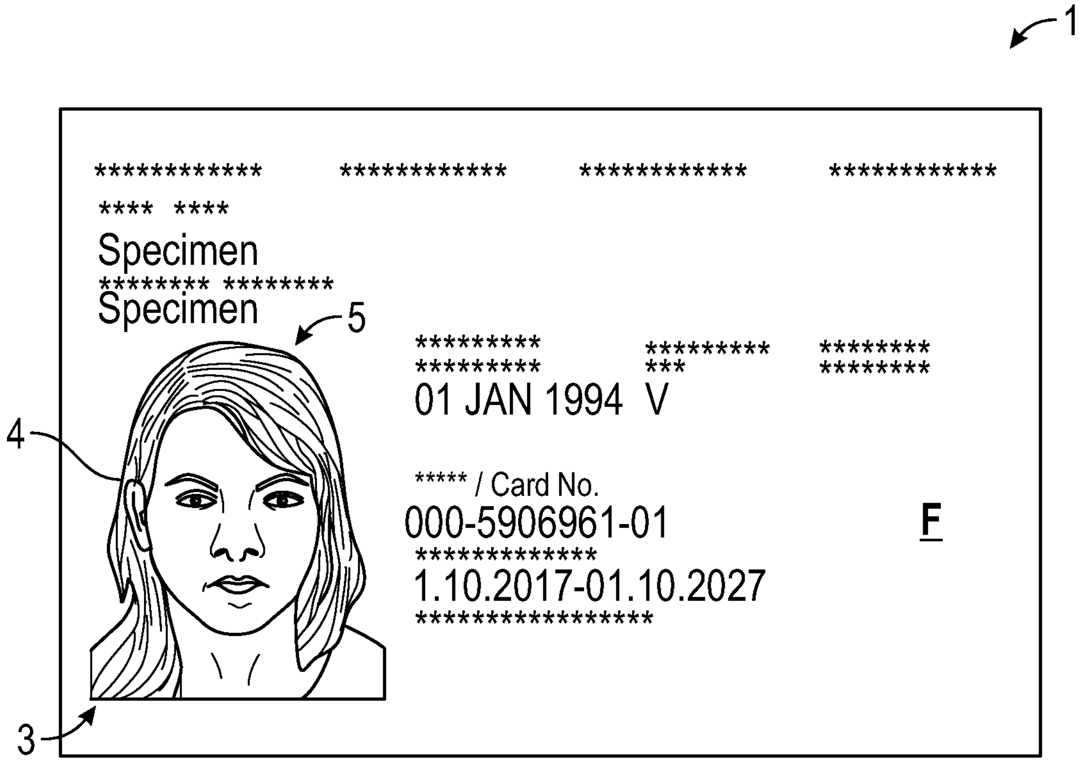
FIG. 5 shows first image information and second image information on a front side of a forge-proof document according to the present disclosure.

It should be noted that while in FIGS. 1-4 the first image information 4 and the second image information 5 are shown in separate areas on the front side F of the document 1, in alternative embodiments, the position of the first image information 4 on the front side F of the document 1 coincides with the position of the second image information 5 on the front side F, as shown with reference to FIG. 5. Thus, in this embodiment, the first image information 4 may be aligned with the second information 5 on the front side F such that the first image information 4 and the second image information 5 are superimposed on the front side F and coincide with each other. It should be noted that while the second image information 5 and the first image information 4 are shown as being the same size in FIG. 5, in accordance with alternative embodiments of the present disclosure, the first image information 4 may be smaller than the second image information 5 or vice versa, i.e., the first image information 4 may be larger than the second image information 5.

As explained above, the first security feature 2 comprises the perforation pattern 6 having the first image information 4 when the document 1 is viewed against a bright background. Moreover, the second security feature 3 comprises the second image information 5 that is displayed by reflecting light emitted thereon.

In accordance with embodiments of the present disclosure, the front side F of the document 1 may comprise the second security feature 3 having a pattern formed using a first printing technique, and the backside B may comprise the second security feature 3 having a pattern formed using a second printing technique. In other words, in this embodiment, the second security feature 3 on the front side F may be formed with a technique that may be different from the technique used to form the second security feature 3 on the backside B. Here, the first and second printing techniques may comprise laser engraving, inkjet printing, or laser printing. In an embodiment where different printing techniques are used to form the second security features 3 respectively on the front side F and the backside B, the first printing technique may comprise laser engraving and the second printing technique may comprise inkjet printing or laser printing.

Further, in an embodiment that employs separate printing techniques for the second security feature 3 on the front side F and the second security feature 3 on the backside B, the second image information 5 formed with the first printing technique may be applied on the front side F and the second image information 5 formed with the second printing technique may be applied on the backside B. Nevertheless, when different printing techniques are employed, the second image information 5 may still correspond to the first image information 6 as discussed above. Furthermore, when different printing techniques are employed, the second image information 5 on the backside B mirrors the second image information 5 on the front side F.

In accordance with embodiments of the present disclosure, a code may be incorporated into the first security feature 2 and the second security feature 3. In some embodiments, the code may only be visible when the document 1 is subjected to special processing. Examples of special processing include exposing the code to blacklight UV light or the like or viewing the code under different optical lenses.

Conversely, a visible code may be incorporated into the first security feature 2 and the second security feature 3. In an embodiment, the code may identify the machine used to create the document 1. In this embodiment, if the document 1 is forged, the machine used to generate the forgery may be identified.

In order to modulate a brightness of the features of the document 1, such as the first security feature 2, the first image information 4, the second security feature 3, and the second image information 5, perforations may be formed in the document 1 that correspond to the first security feature 2, the first image information 4, the second security feature 3, and the second image information 5 in accordance with embodiments of the present disclosure. In particular, techniques for modulating brightness tones, similar to graphic art, are possible by applying perforations according to a fixed grid, where the size of the perforations may be a measure of intensity. An example of this technique are black and white photographs that are reproduced in newspapers. Moreover, by using perforation holes of equal dimensions, brightness tones may be created where the density of the dimensions of the perforation holes may be a measure of the intensity. An example of this technique can be found in the series of Netherlands postage stamps in which the likeness of Her Majesty the Queen is represented by dots of varying density. In accordance with embodiments of the present disclosure, both techniques can be combined.

Figure 6:
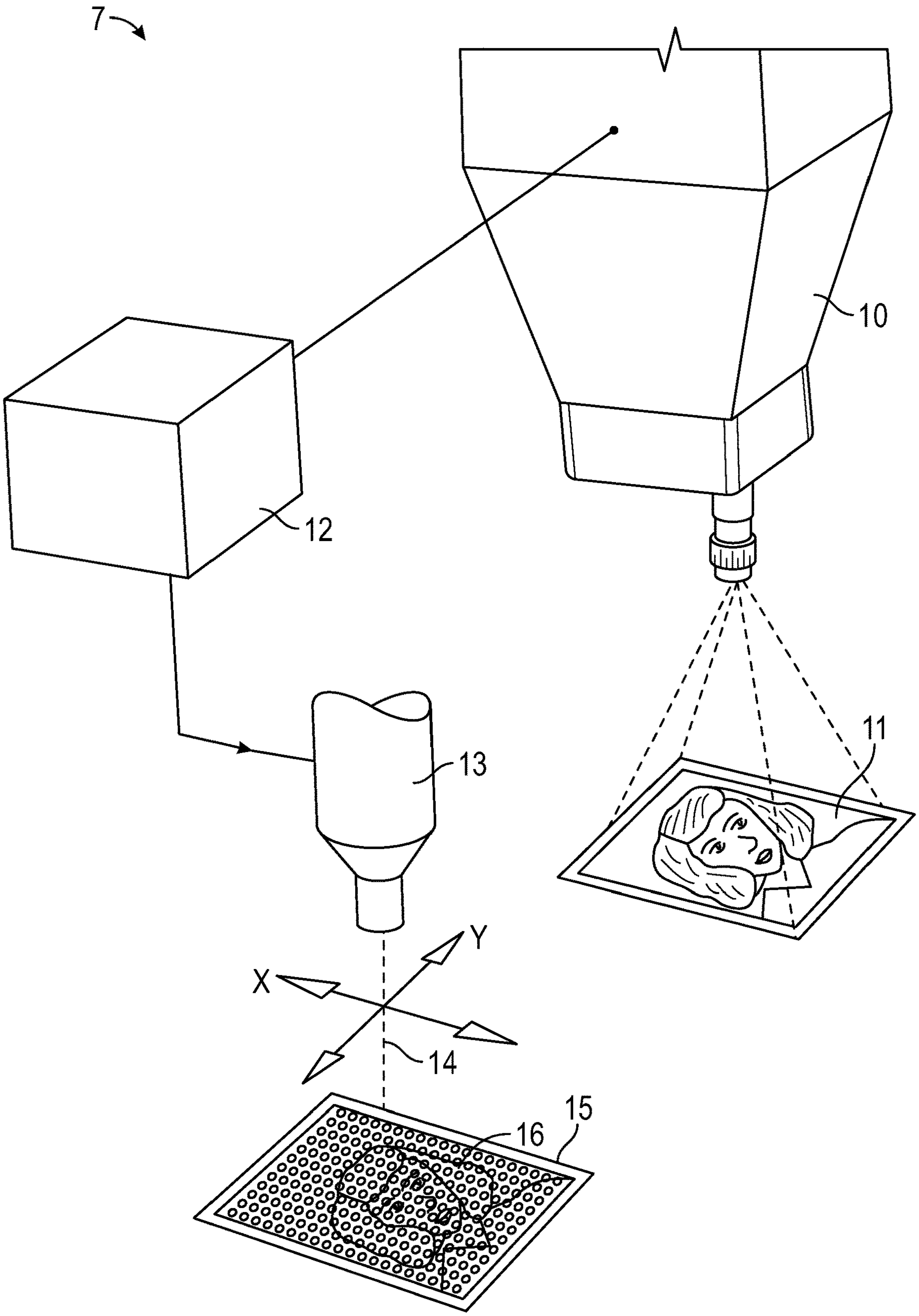
FIG. 6 shows a schematic perspective view of a device for manufacturing a forge-proof document according to the present disclosure.

Now making reference to FIG. 6, a system 7 that may be used to form perforations for the first security feature 2, the first image information 4, the second security feature 3, and the second image information 5, in accordance with embodiments of the present disclosure, is illustrated. The system 7 includes a video camera 10 directed at a passport photograph 11. The video camera 10 captures an image of the passport photograph 11 and converts the captured image into data of an electronic form. The video camera 10 then feeds the data to a computing device 12, which then stores the electronic version of the captured image.

The system 7 also may include a laser beam generating means 13 that may be controlled by the computing device 12. The computing device 12 controls an intensity of a laser beam 14 output from the laser beam generating means 13 and focuses the laser beam 14 transmitted by the laser beam generating means 13. In addition, the computing device 12 controls the direction in which the laser beam 14 is transmitted. In accordance with embodiments of the present disclosure, the direction of the laser beam 14 may be varied in multiple planes in order to apply a perforation pattern 16 that, in some embodiments, corresponds to the security information and/or image information discussed above, respectively, in a document 15.

The laser beam generating means 13 may include mirror systems, which may be used to adjust the laser beam 14 output from the laser beam generating means 13. In accordance with further embodiments of the present disclosure, the laser beam generating means 13 stands still and a carrier on which the document 15 is placed moves relative to the laser beam generating means 13 and the laser beam 14. In further embodiments, the carrier may move in one direction, such as in a direction Y, while the laser beam generating means 13 moves in a second direction, such as a direction X. The choice between the various possibilities depends on the technology used. Nevertheless, the perforation pattern 16 and security information, such as the first security feature 2, the first image information 4, the second security feature 3, and the second image information 5, should comprise perforation holes of differing diameter, wherein the diameter may be a function of the brightness to be represented in any of the first security feature 2, the first image information 4, the second security feature 3, and the second image information 5. Perforation holes of differing density may be created by causing the laser beam generating means 13 to generate more or fewer holes locally. An example of this shown with reference to FIG. 7.

Figure 7:
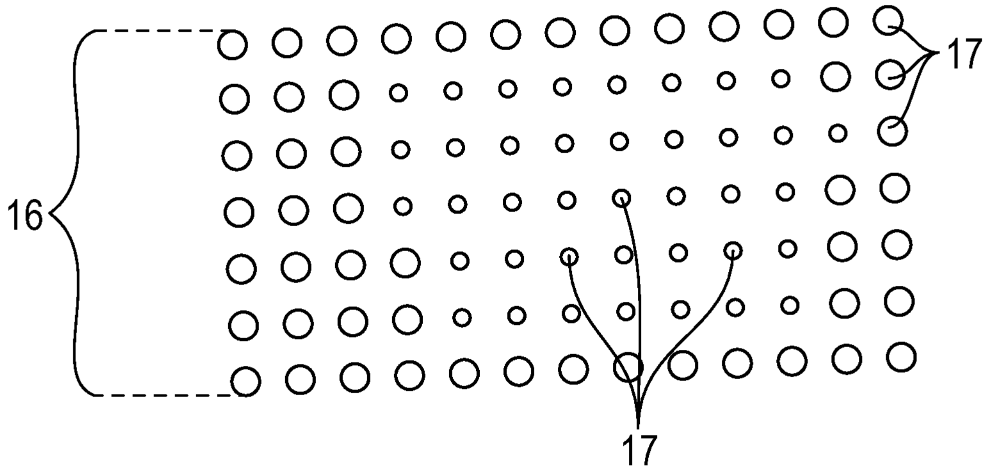
FIG. 7 shows a detail view of a perforation pattern such as illustrated in FIG. 6.

FIG. 7 illustrates the perforation pattern 16 having perforation holes 17 formed therein, in accordance with embodiments of the present disclosure. As may be seen with reference to FIG. 7, the perforation holes 17 have different diameters and are ordered in a regular grid, such as a rectangular grid. The dimension of the perforation holes 17 may be a measure for the brightness of the image represented by the perforation pattern 16, such as the passport photograph 11 or the first security feature 2, the first image information 4, the second security feature 3, and the second image information 5. It is noted here that the dimensions of the perforation holes 17 can be adjusted continuously, such as in an analog manner. However, since the computing device 12 is used, a large number of stages may be obtained. To further illustrate, the diameters of the perforations may be enlarged in a number of steps with a laser, such as the laser beam generating means 13, using the computing device 12. By using the techniques disclosed herein to form the perforation holes 17, as one skilled in the art would readily appreciate, images formed by the perforation holes 17 provide adequate renderings of the actual image and therefore allow for easy comparison between the rendering formed by the perforation holes 17 and the actual image. Thus, an authentic version of an image, such as the passport photograph 11 and the first security feature 2, the first image information 4, the second security feature 3, and the second image information 5, are easily obtainable while at the same time being hard to illicitly reproduce. Moreover, in accordance with embodiments of the present disclosure, the perforation pattern formed by the perforation holes 17 may be adapted to present a stereo image. Also, in accordance with an embodiment of the present disclosure, the perforation pattern may be adapted to present an image that differs according to a viewing angle.

Figure 8:
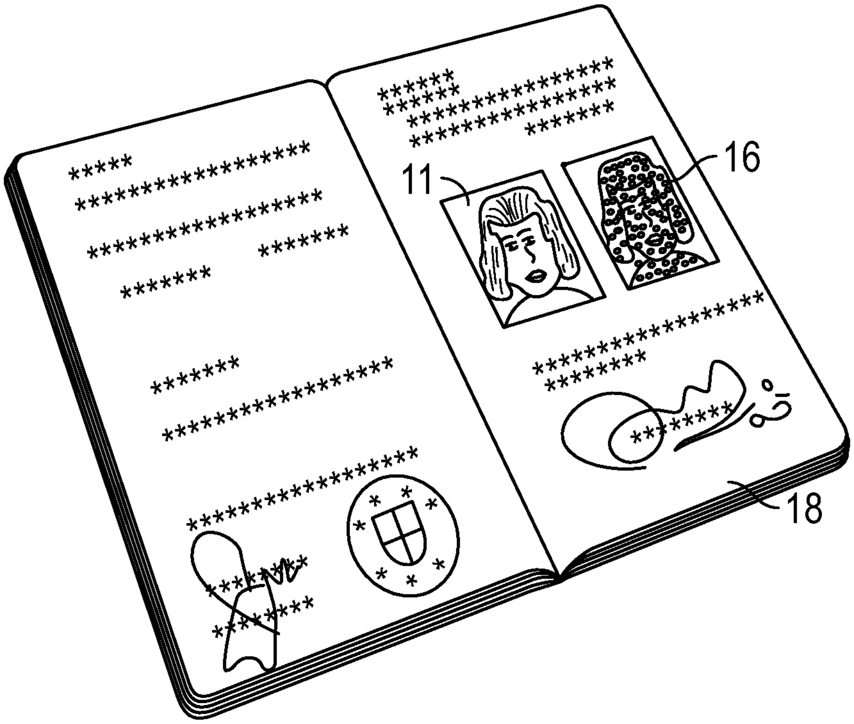
FIG. 8 shows a schematic perspective view of a passport according to the present disclosure.

Now making reference to FIG. 8, a passport 18 in which the passport photograph 11 is fixed, for instance by means of glue, tubular rivets or other manner of attachment, is shown, in accordance with the present disclosure. In addition, as shown with reference to FIG. 8, the perforation pattern 16 representing the relevant image of the passport photograph 11 may be applied adjacent to the passport photograph 11. This allows for a comparison to be made by holding up the relevant page of the passport photograph 11 to a light source. Furthermore, it may also possible to apply the perforation pattern 16 on another page of the passport if a quick visual comparison may be possible. This configuration also makes forgery more difficult since two different pages must be forged. Moreover, images produced in accordance with embodiments of the present disclosure may be enlarged or reduced in size or modified in any other manner.

Figure 9:
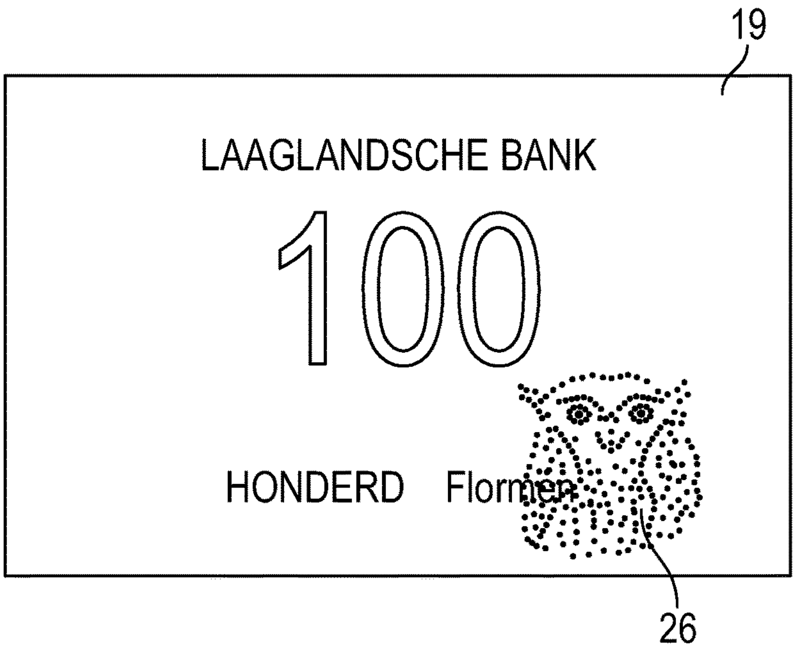
FIG. 9 shows a view of a bank note provided with a pattern according to the present disclosure.
Figure 10:
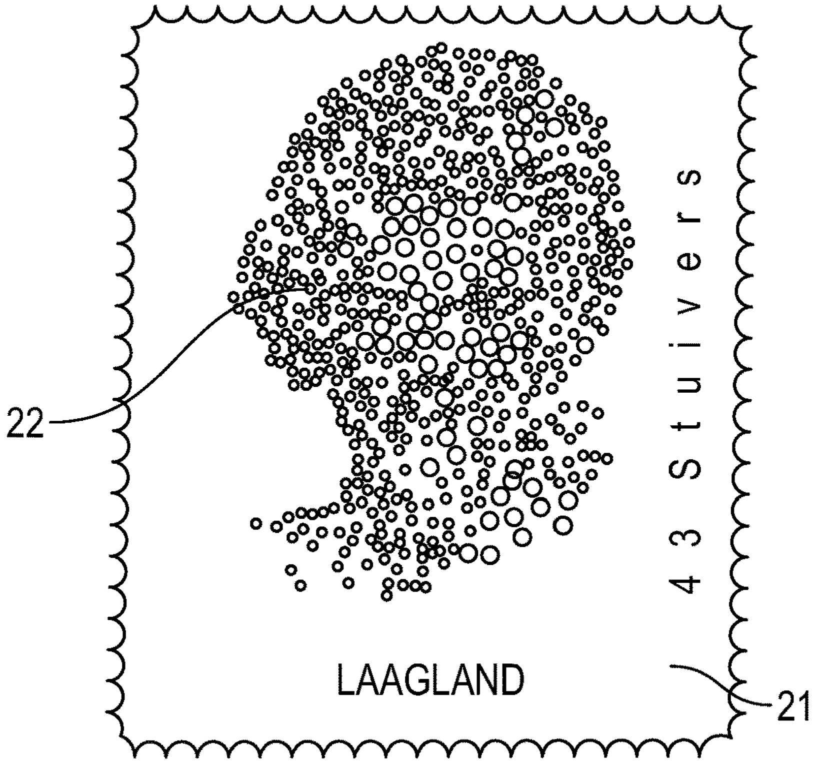
FIG. 10 shows a postage stamp provided with a perforation pattern according to the present disclosure.

FIG. 9 shows a banknote 19 which may be provided with a perforation pattern 20, in the form of an owl. The perforation pattern 20 is not related to another image arranged on the banknote but is formed exclusively as a security feature. Furthermore, in accordance with embodiments of the present disclosure, the perforation pattern 20 is formed as discussed above. Thus, banknotes, such as the banknote 19, may be provided with security features, such as the perforation pattern 20, in accordance with embodiments of the present disclosure. The perforation pattern 20 represents different brightness tones, for instance grey tones, formed in accordance with the embodiments of the present disclosure. Use is otherwise made herein of a free grid, wherein the dimensions of the perforations in perforation pattern 20 are the same but the density of the perforations varies in order to represent the grey tones. The same applies for a postage stamp 21 shown in FIG. 10. The postage stamp 21 may include a perforation pattern 22 in the form of a likeness of Her Majesty the Queen. In this embodiment, both forms are herein combined, i.e. a varying grid, wherein the dimensions of the perforations also differ.

It should be noted that the description of FIGS. 6-10 can be applied for the first security feature 2, the first image information 4, the second security feature 3, and the second image information 5 discussed with reference to FIGS. 1-5. Thus, some or all mentioned features discussed with reference to FIGS. 6-10 can be incorporated in the embodiment shown with regards to FIGS. 1-4.

As noted above, when the document 1 is viewed against a bright background, the first security feature 2 and the first image information 4 are visible. In accordance with an embodiment of the present disclosure, the first security feature 2, which may include the perforation pattern 6, displays grey tones when viewed against a bright background. In this embodiment, the document 1 may be manufactured from a material that transmits light to a limited extent, where some of the perforations forming part of the perforation pattern 6 extend over part of the document 1 at the position of the perforation pattern 6. Thus, a thickness of the remaining portion of the document 1 at the position of the perforation pattern 6 may be modulated in accordance with the image to be displayed, i.e., the security features 2 and 3 and the image information 4 and 5. The grey tones displayed when viewed against a bright background may be controlled by modulating the density and/or the diameter of the perforations in the first security feature 2 in order to generate image information. Embodiments that explain how to achieve these different grey tones will now be discussed with reference to FIGS. 11-18.

Figure 11:
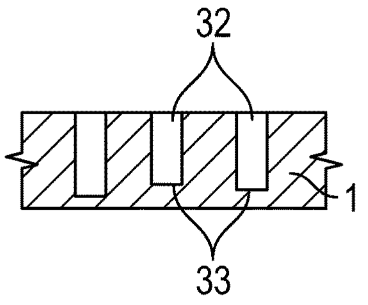
FIG. 11 shows a cross-sectional view of a forge-proof document according to the present disclosure.

Now referring to FIG. 11, a cross-sectional view of the document 1 in FIGS. 1-5 is shown, in accordance with an embodiment of the present disclosure. The document 1 may be manufactured from plastic but can also be manufactured from another material, such as paper or textile. The document 1 may also be manufactured from a laminated material, wherein the laminated material may include a combination of diverse materials. In this embodiment, the document 1 may include perforations 32 arranged therein. Here, the perforations 32 do not extend through a whole thickness of the document 1 but instead leave portions 33 of the document 1 intact. As may be seen with reference to FIG. 11, the remaining portions 33 of the perforations 32 have different thicknesses. Thus, different ones of the portions 33 transmit light differently. In particular, when the document 1 is held against a light source, an image comprising grey tones will result based on the different thicknesses of the portions 33 and the depth of the perforations 32.

Figure 12:
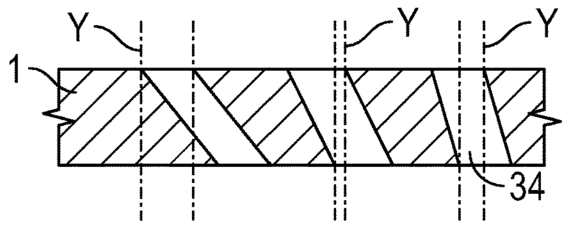
FIG. 12 shows a cross-sectional view of a forge-proof document according to the present disclosure.

FIG. 12 shows an embodiment of the document 1 in accordance with another embodiment of the present disclosure. In this embodiment, the document 1 may include perforations 34 that are obliquely arranged relative to an axis Y, i.e., at an angle differing from 90° relative to the axis Y. In this embodiment, grey tones of an image formed in the document 1 may be modulated by varying an angle of the perforations 34 relative to the axis Y.

Figure 13:
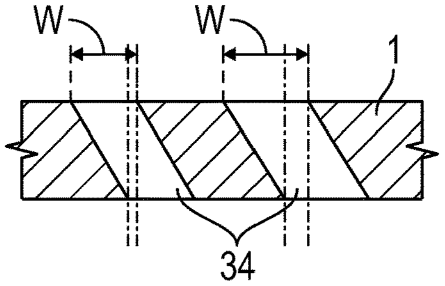
FIG. 13 shows a cross-sectional view of a forge-proof document according to the present disclosure.
Figure 14:
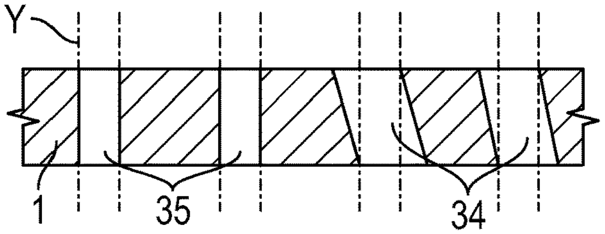
FIG. 14 shows a cross-sectional view of a forge-proof document according to the present disclosure.

In another embodiment of the present disclosure, a width of the perforations may be modulated to control the grey tones. For example, making reference to FIG. 13, the document 1 may include perforations 34 having varying widths W. In an embodiment, the widths W correspond to a diameter of the perforations 34 where the perforations have a circular configuration. It is further possible as shown in FIG. 13 to modulate the width W of the perforations 34. It should be noted that the different types of modulation described with reference to FIGS. 11-13 may be combined. Moreover, one of the two forms of modulation or both forms of the modulation may be combined while at the same time controlling the density of the perforations 32 and 34. An example of combining different forms of modulation is shown with reference to FIG. 14.

When the document 1 is viewed at the front side F or the backside B, as indicated with dotted lines in FIG. 12, a similar grey tone is displayed for perforations having the same configuration. The grey tone can be modulated by varying the density or by varying the size of the perforations as discussed with reference to FIGS. 11-14. Using the techniques described with reference to FIGS. 11-14, an image may be generated on the document 1. As detailed above, the perforations 34 may be obliquely arranged. Since the perforations 34 may have an oblique arrangement, the perforations 34 may be used to convey extra information, such as by arranging them in the form of a letter or a logo. In accordance with an embodiment of the present disclosure, the extra information may be visible when the image is viewed at a determined angle.

Figure 15:
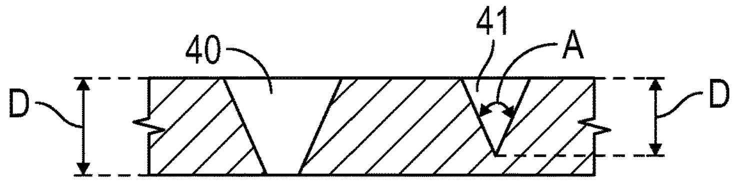
FIG. 15 shows a cross-sectional view of a forge-proof document according to the present disclosure.

In addition to the configurations shown with reference to FIGS. 11-14, perforations for the document 1 may have the configuration illustrated with reference to FIG. 15. In the embodiment shown with reference to FIG. 15, perforations 40 and 41 in the form of a cone or in the form of a truncated cone are obtained. Here, the perforation 40 may be continuous through the document 1 while the perforation 41 does not extend completely through the document 1. Thus, the perforation 41 may be referred to as being blind. In this embodiment, visible grey tones can be modulated by varying a depth D of the perforations 40 and 41 or an apex angle A. In this embodiment, varying the depth D and/or the apex angle A forms a combination of depth of hole modulation and diameter of hole modulation.

Figure 16:
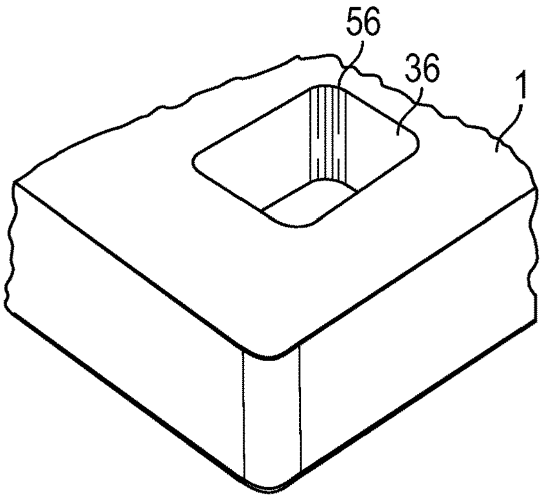
FIG. 16 shows a schematic perspective detail view of a forge-proof document according to the present disclosure.

In addition to a circular configuration, the perforations in the document 1 may have a rectangular configuration, as shown with regard to FIG. 16. The document 1 may include a perforation 36 having a rectangular configuration. In this embodiment, the perforation 36 may be formed with a laser beam since a laser beam may be controlled to create complex shapes, such as the perforation 36 that may include a contour 56. In addition to a rectangle, other shapes are possible for the perforations disclosed herein, such as triangles, squares, ovals, or the like.

Figure 17:
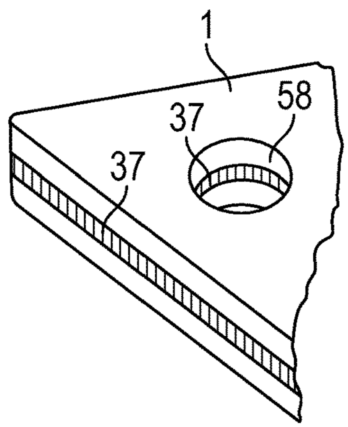
FIG. 17 shows a schematic perspective detail view of a forge-proof document according to the present disclosure.

Furthermore, the perforations in the document 1 may be formed with different layers, where one of the layers may include an ink, as shown with reference to FIG. 17. This Figure illustrates the document 1 having a perforation 58 along with an ink layer 37. In embodiments where the perforation 58 is formed with a laser, the ink layer 37 is not noticeable since the ink layer 7 may also removed by the laser. However, when the perforation 58 is formed with a mechanical means, such as drilling that may be used by a forger, the ink in the ink layer 37 will smear, which is clearly visible. The configuration of FIG. 17 may also be applied to laminated cards, the inner layer of which may have a color, for instance white, which differs from the colors of the other layers.

Figure 18:
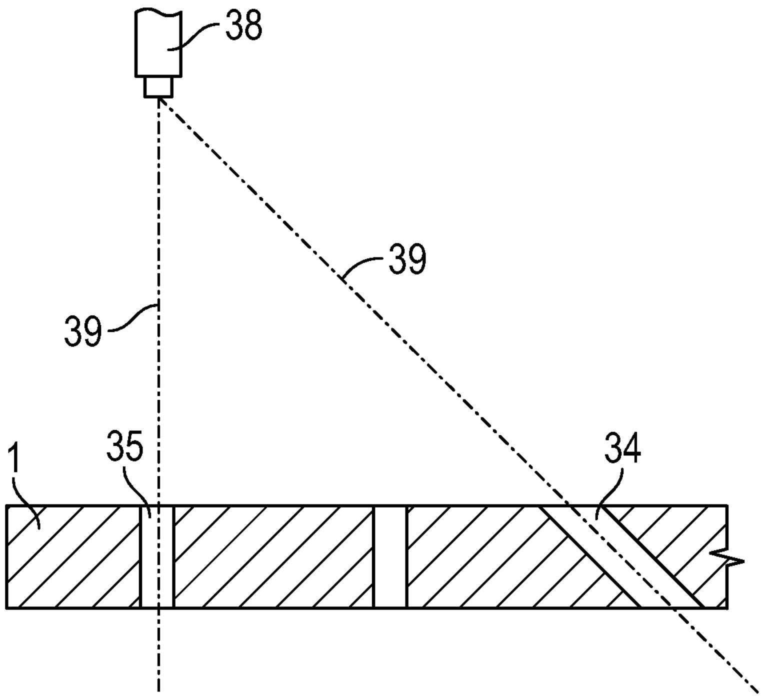
FIG. 18 shows a method of forming perforations according to the present disclosure.
Figure 19:
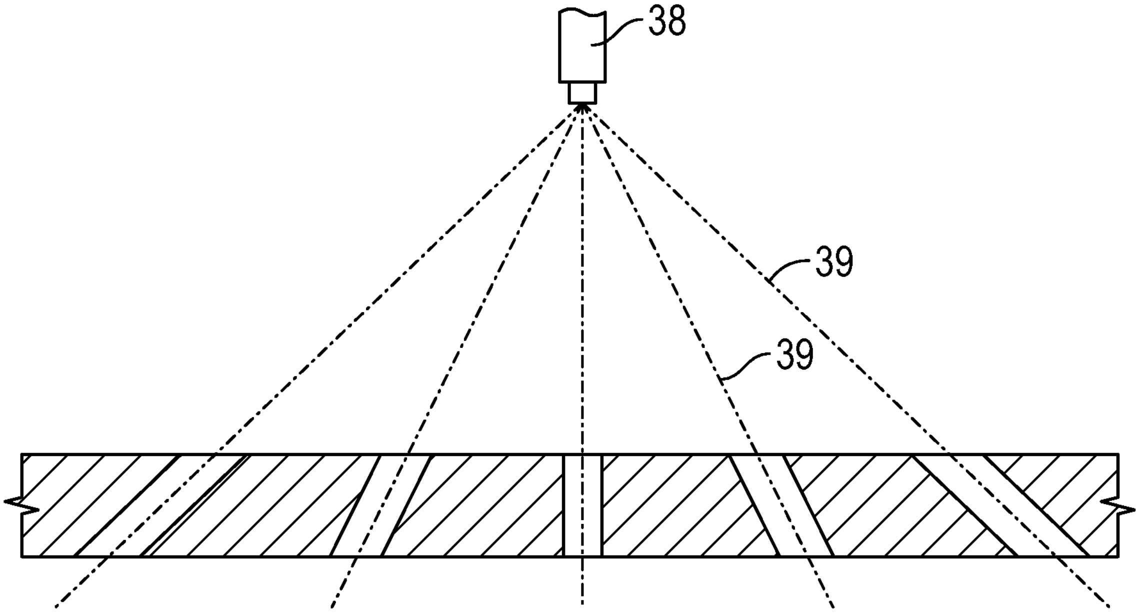
FIG. 19 shows a method of forming perforations according to the present disclosure.

FIGS. 18 and 19 illustrate a method of forming the perforations disclosed herein in accordance with embodiments of the present disclosure. FIG. 18 shows how it may be possible, using a single laser beam generating means 38, to form the perforations 32 and 34 in the document 1. In order to form the perforations 32 and 34 in the document 1, laser light beams 39 from the laser beam generating means 38 are sufficiently deflected. In addition, accurate stops and the like may be used for positioning the document 1 in the different positions to form the perforations 32 and 34. It should be noted that, in accordance with embodiments of the present disclosure, perforations having configurations that differ from the perforations 32 and 34 may be formed with the laser beam generating means 38.

FIG. 19 shows an embodiment where the laser beam generating means 38 is placed relatively close to the document 1, such that due to angular deviations of the laser beams 39, the perforations 32 and 34, which as discussed above, are formed at different angles. It will further be apparent that it is possible within the scope of the present disclosure to vary the perforations in countless ways from the shown embodiments.

Again, it is pointed out that the description of FIGS. 11-19 may be applied to the first security feature 2, the first image information 4, the second security feature 3, and the second image information 5 discussed with reference to FIGS. 1-5. Thus, some or all mentioned features of FIGS. 11-19 can be incorporated in the embodiment shown with regards to FIGS. 1-5.

Now making reference to FIGS. 20A-B, additional details of the facial image security feature 60 and the document 1 having the same will be described in accordance with at least some embodiments of the present disclosure. The document 1 is shown to have the facial image security feature 60 provided thereon. In accordance with embodiments of the present disclosure, the facial image security feature 60 may have the same characteristics as the first security feature 2 described above. In addition, the facial image security feature 60 may be formed in accordance with the techniques detailed above with respect to the first security feature 2. In this particular configuration, the document 1 exhibits the facial image security feature 60 in an overlapping relationship with both an image area 42 as well as an information area 43. In some embodiments, the image area 42 may correspond to or be similar to the second security feature 3 as described above. Furthermore, the image area 42 may include an image that corresponds to a holder of the document 1. The information area 43 may correspond to or be similar to the first image information 4. In some embodiments, the image area 42 may or may not contain a security feature, such as the second security feature 3. The security feature, if provided, in the image area 42 may be holographic or non-holographic in nature. The security feature, if provided, in the information area 43 may be holographic or non-holographic in nature.

In some embodiments, the image area 42 may be adjacent to, but not overlapping with, the information area 43. In some embodiments, the information area 43 may contain at least some information that describes an image or collection of images provided in the image area 42. As a non-limiting example, the information area 43 may contain information describing a person or subject whose image may be provided in the image area 42. Such information contained in the information area 43 may include, without limitation, the name, address, date of birth, etc., of the individual pictured in the image area 42.

As can be appreciated, the strength of the facial image security feature 60 is inherently provided by the features of the security feature (e.g., the perforations, patterns, etc.). Embodiments of the present disclosure further contemplate that the positioning of the facial image security feature 60 can help improve the overall strength of any security feature provided in the image area 42 and/or information area 43. For instance, by providing the facial image security feature 60 with an overlapping relationship with both the image area 42 and the information area 43, a binding between the image area 42 and the information area 43 can be established vis-à-vis the facial image security feature 60. In some embodiments, the facial image security feature 60 may include an image that is based on, identical to, or mirrors an image provided in the image area 42. Furthermore, in some embodiments, the facial image security feature 60 may include an image based on informational content in the information area 43. However, because the facial image security feature 60 overlaps both the image area 42 and information area 43, the facial image security feature 60 links the two areas 42, 43 and provides an indication that both areas 42, 43 were created at the same time as the facial image security feature 60.

As with other first security features 2 depicted and described herein, it should be appreciated that the facial image security feature 60 may be provided as an array of perforations of varying sizes so as to replicate an image, which may or may not correspond to the image in the image area 42. The perforations of the facial image security feature 60, as shown in FIG. 20B, may have different sizes and different angles and/or orientations as depicted and described hereinabove. Furthermore, embodiments of the present disclosure contemplate that the document 1 may be polycarbonate and the perforations of the facial image security feature 60 may be provided in the polycarbonate of the document 1 and/or in other layers of different materials provided in the document 1. For instance, at least some of the perforations may be provided in a holographic image within the image area 42, which may or may not include providing perforations within a polycarbonate layer or some other layer constituting a holographic image.

Although the facial image security feature 60 is shown as overlapping two types of areas on the document 1, it should be appreciated that the document 1 may be provided with more than two distinct areas (whether image areas, information areas, or other discrete areas on a document). In addition, the facial image security feature 60 may be sized and positioned so as to overlap two, three, four, or more of the distinct areas on the document 1. Moreover, although the image area 42 and the information area 43 are shown as being adjacent and non-overlapping, it should be appreciated that embodiments of the present disclosure contemplate a document where at least a portion of the image area 42 overlaps a portion of the information area 43 and the overlap between the image area 42 and the information area 43 may have at least some of the facial image security feature 60 provided thereon.

Figure 20A:
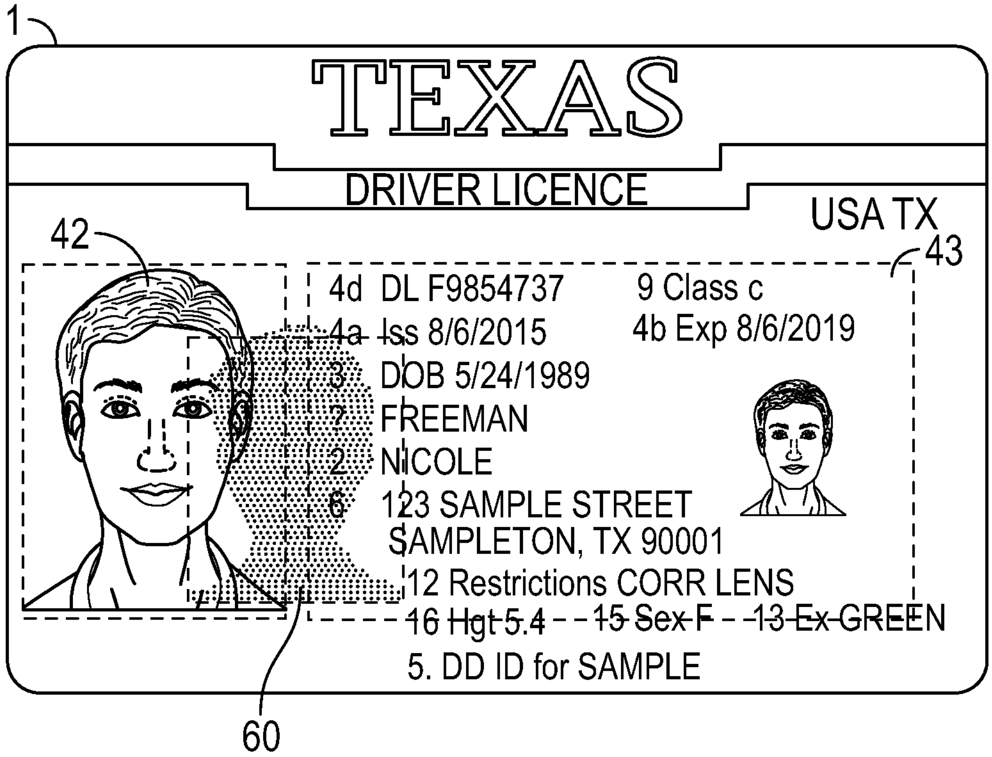
FIG. 20A shows a security feature provided on a forge-proof document according to embodiments of the present disclosure.
Figure 20B:
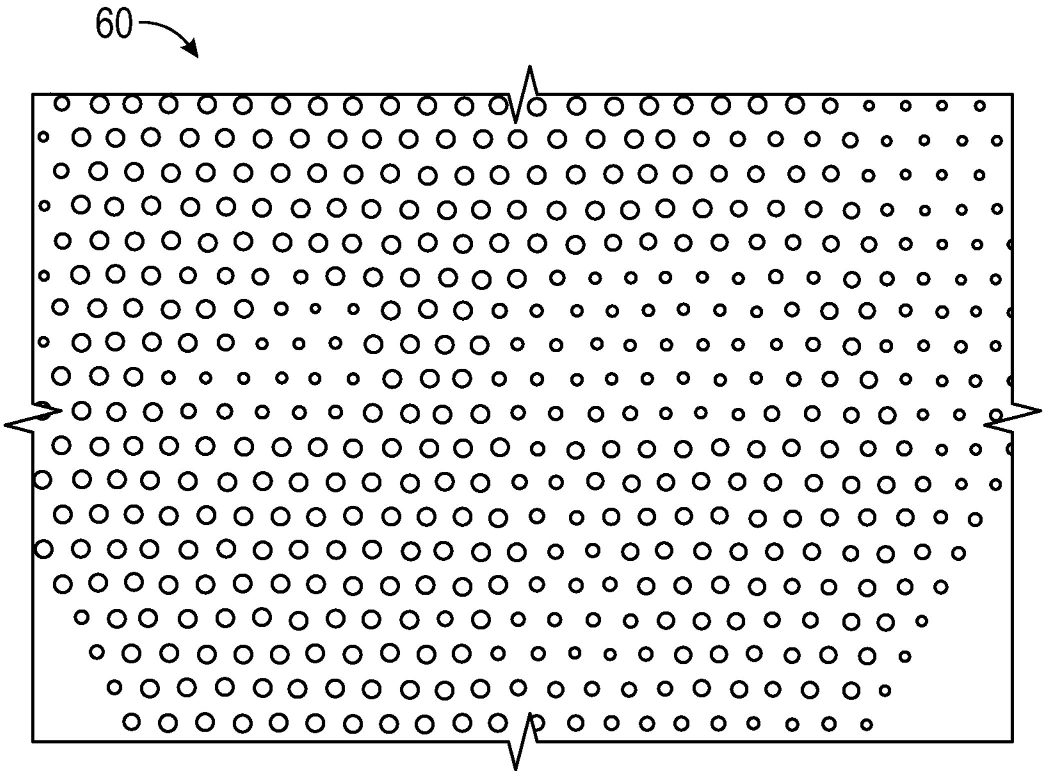
FIG. 20B shows additional details of the security feature provided in FIG. 20A.

Although the facial image security feature 60 shown in FIG. 20A is shown to be based on the image provided in the image area 42, it should be appreciated that some or all of the facial image security feature 60 may be based on information provided in the information area 43. For instance, an image in the facial image security feature 60 may spell out information that may be provided in the information area 43. As an example, the image may correspond to a day/month/year depicted within the information area 43 and the image may be a reprint of the holder's date of birth or some representation of the date of birth (e.g., an image of the birth year, etc.).

More broadly, while an image, such as a facial image, on the document 1 may result from a pattern of perforations formed on or in the document, images on the document that may result from such a pattern of perforations formed on or in the document, or more generally the various credentials of the present disclosure, are not limited to a facial image, such as an individual's photo, or other images. As shown in FIGS. 21-24, which illustrate a portion of a document 1, additional information 50, in the form of images or graphics other than facial images or in the form of alphanumeric characters, may additionally be provided similarly as a pattern of perforations formed on or in the document. As with the facial image security feature 60, a pattern of perforations forming the additional information 50 on the document 1 may be similarly created using any of the means and methods described herein. Such means and methods used for perforation patterns described herein, including those forming the facial image security feature 60 and/or the additional information 50, may also include those means and methods described in detail in PCT Publ. No. WO 00/43216, titled "Security Document with a Perforation Pattern," and in European Patent Appl. No. 18188521, titled "Forge-Proof Document," each of which is hereby incorporated by reference herein in its entirety. Accordingly, a credential or document 1 may include a combination of the facial image security feature 60 comprising a facial image and one or more items of additional information 50, each resulting from a pattern of perforations formed on or in the document.

The additional information 50 may be any suitable information. Often, the additional information 50 can be information that may be relevant to the particular type of credential 10 on or in which the additional information is formed. Still further, the additional information 50 may desirably be information that may be particular to the person identified by the document 1, as opposed to information that does not help identify a person or that is generic among a group of people, such as the issuing authority (e.g., state, country, or organization) of the credential 10. Non-limiting examples of the type of additional information 50 that may be included on the document 1 include: birthdate, in any format; driver's license class or certification; identification of membership in a professional organization; professional license number; permission(s) information; security clearance level; etc. For example, being of a certain age is a requirement for many different services and products, such as tobacco or alcohol, which is often government regulated. Accordingly, as illustrated in FIGS. 21-24, providing additional information 50 corresponding to the birthdate, such as month and year of birth, of a holder of the document 1 along with a facial image security feature 60 permits easy visual verification of both the identification of the holder (using the facial image security feature 60) and the age of the holder (using additional information 50) at the same time, in substantially one viewing motion. In accordance with an embodiment of the present disclosure, the facial image security feature 60 may be similar to the first security feature 2, in terms of features and how the facial image security feature 60 is formed.

As indicated above, FIGS. 21-24 illustrate examples of a portion of a credential or the document 1 including both the facial image security feature 60 and the additional information 50 as patterns of perforations formed on or in the document. In general, the additional information 50 may be provided in any suitable location of the document 1 relative the facial image security feature 60.

Figure 21:
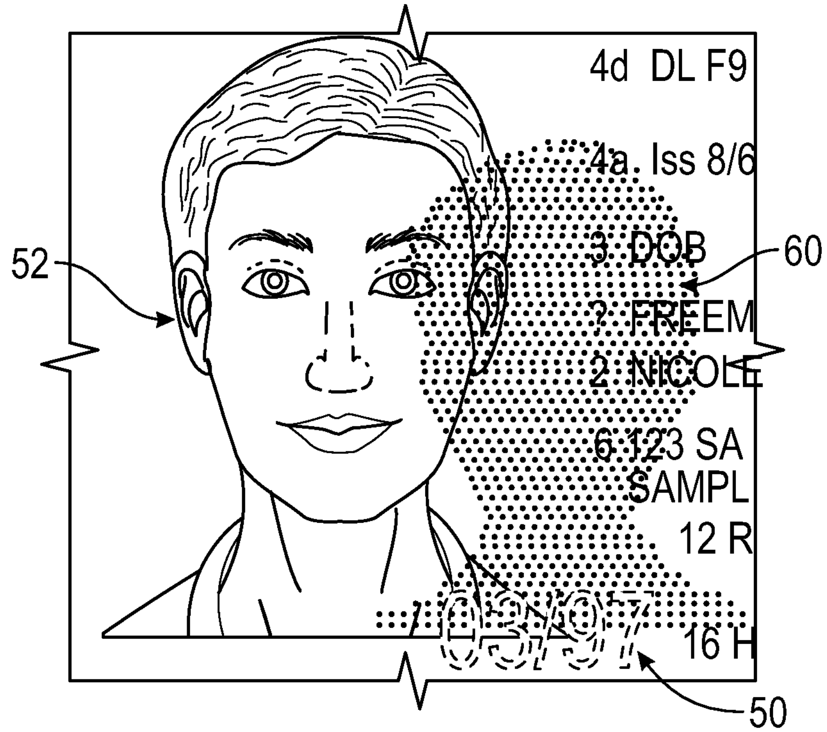
FIGS. 21 and 22 each illustrate a portion of a credential or identification document according to an embodiment of the present disclosure including a facial image and additional information, both provided as a pattern of perforations.

FIG. 21 illustrates an example portion of the document 1 wherein the additional information 50 at least partially overlaps with the facial image of security feature 28. In other embodiments, the additional information 50 could completely overlap with the facial image of the facial image security feature 60. Additionally, either or both the facial image of the facial image security feature 60 or additional information 50 may at least partially overlap with another image, such as a facial image 52 in image area 42 of the document 1.

Figure 22:
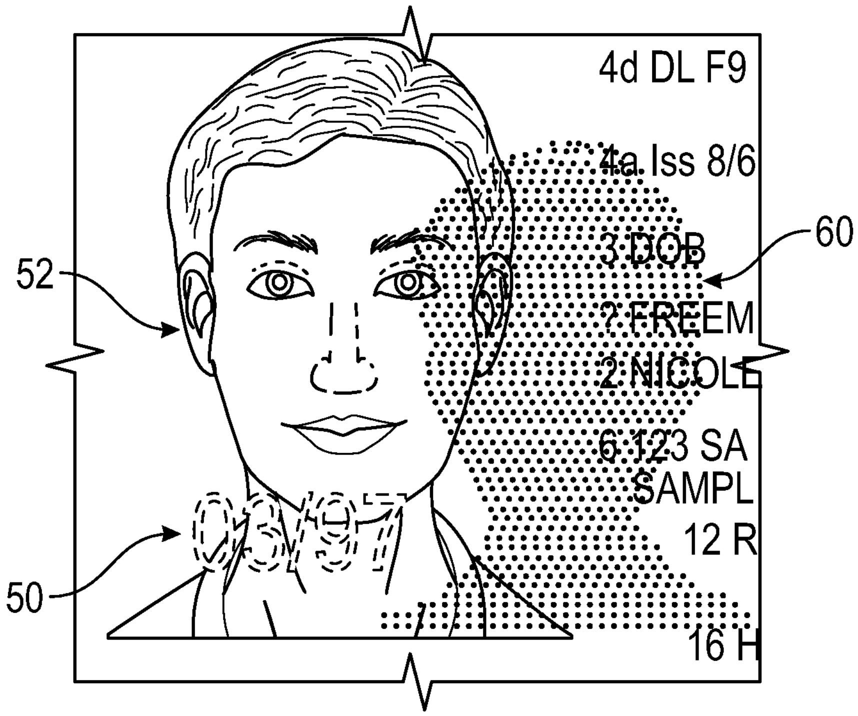

FIG. 22 illustrates another example portion of the document 1 where the additional information 50 may be offset from the facial image of the facial image security feature 60 and/or otherwise does not overlap with the facial image of the facial image security feature 60. In some cases, either or both the facial image of facial image security feature 60 or additional information 50 may at least partially overlap with another image, such as the facial image 52, of the identification document 1.

Figure 23:
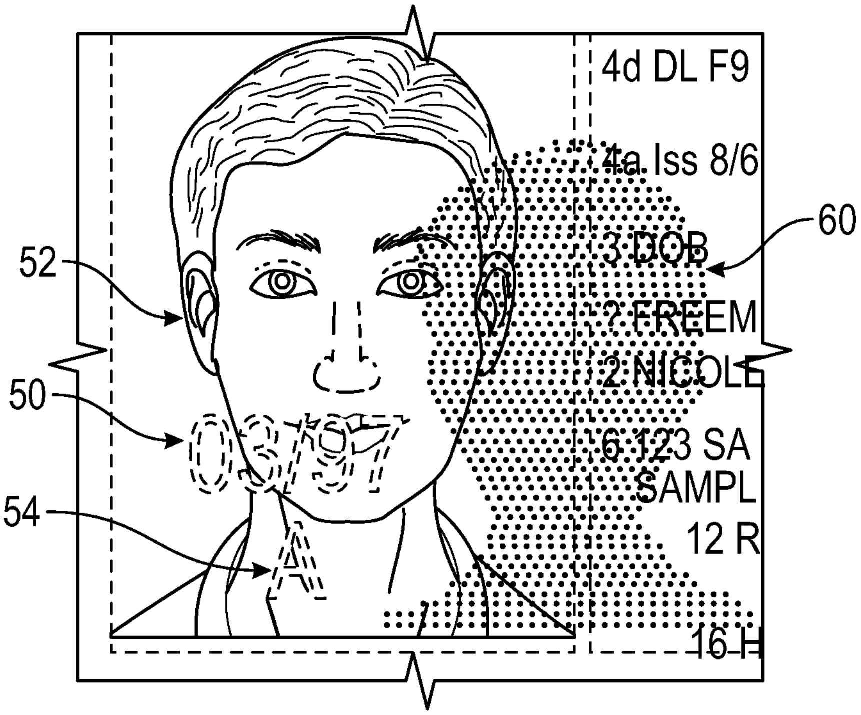
FIG. 23 illustrates a portion of a credential or identification document according to an embodiment of the present disclosure including a facial image and multiple items of additional information, each provided as a pattern of perforations.

FIG. 23 illustrates an example portion of a credential document 1 wherein multiple items of additional information 50, 54, such as information corresponding to birthdate (e.g., 50) and information corresponding to a driver's license class or certification (e.g., 54), are provided. Although two items of additional information 50, 54 are shown in FIG. 23, any suitable number of items of additional information may be provided as desired or required for the document 1. As illustrated in FIG. 23, the additional information 50, 54 may be offset from the facial image of facial image security feature 60 and does not overlap with the facial image of facial image security feature 60 but does at least partially overlap with another image, such as the facial image 52. However, any particular item of additional information, such as additional information 50 or additional information 54, could overlap, partially overlap, or not overlap with facial image of the facial image security feature 60 or any other image, such as a facial image 52, of the document 1. Moreover, not all the additional information 50, 54 need be provided in the same general location. For example, some additional information could at least partially overlap with the facial image security feature 60, such as the additional information 50 in FIG. 21, while other additional information does not overlap with facial image security feature 60, such as additional information 54 in FIG. 23.

Figure 24:
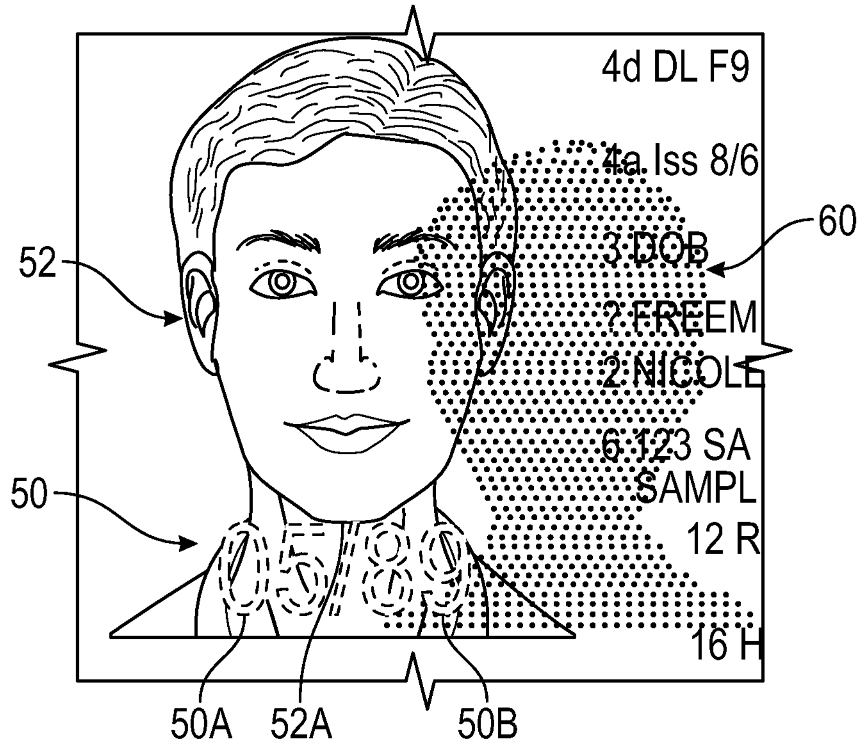
FIG. 24 illustrates a portion of a credential or identification document according to an embodiment of the present disclosure including a facial image and multiple items of additional information, both provided as a pattern of perforations.

FIG. 24 illustrates another example portion of the document 1 wherein the additional information 50 may include portions 50A and 50B. In this example, the portion 50A, such as a month, may be to the left of a chin 52A of the facial image 52. Moreover, in this embodiment, the portion 50B, such as a year, may be to the right of the chin 52A of the facial image 52.

Using a combination of a facial image, such as the facial image of the facial image security feature 60, and additional information, such as the additional information 50, each comprised of a pattern of perforations formed in a substrate, can provide more accurate and verifiable data, which can be processed faster. As described herein, using images comprised of a pattern of perforations formed in a substrate, in general, increases the likelihood that a credential is not fraudulent. Integrating such a security feature (e.g., perforated images) with multiple data points, such as a facial image and additional information, as described herein, further increases the likelihood that a credential is not fraudulent as it would be even harder to create a fake or false copy of the credential. Additionally, integrating the security feature of perforated images with multiple data points permits relatively easy and quick authentication of the identification document (using, in general, fraudulent-deterring perforated images), verification of the identification of the holder (using, for example, a perforated facial image), and verification of additional personal information, such as age of the document holder, (using, for example, perforated additional personal information) substantially simultaneously with substantially a single viewing action or motion.

Referring back to FIG. 20A, the facial image security feature 60 is shown to be provided on the front side F of the document 1. It should be appreciated that the facial image security feature 60 may overlap both the image area 42 and the information area 43, but the facial image security feature 60 may actually be provided on the backside B of the document 1. For instance, the facial image security feature 60 may be provided on the backside B of the document 1, but still in an overlapping relationship with the image area 42 and information area 43. The facial image security feature 60 may be laser-engraved on either the front side F or backside B of the document 1, or a combination thereof. Thus, some portions of the facial image security feature 60 may be provided on the front side F of the document 1 whereas other portions of the facial image security feature 60 may be provided on the backside B of the document 1. Furthermore, in some embodiments, both image content of the image area 42 and information from the information area 43 may be inkjet printed onto the front side F of the document 1. Moreover, the facial image security feature 60 may be formed using the techniques described herein, such as, but not limited to, laser engraving on a front side of the document 1. In embodiments where the image area 42 and the information area 43 are inkjet printed and the facial image security feature 60 is laser engraved, portions of the first security feature may remove informational content that is inkjet printed onto the front side F of the document 1 along with image content that is inkjet printed.

In some embodiments, the facial image security feature 60 overlaps the image area 42 and the information area 43 in equal proportions. In some embodiments, the facial image security feature 60 overlaps the image area 42 in a larger proportion as compared to the information area 43. In some embodiments, the facial image security feature 60 overlaps the image area 42 in a smaller proportion as compared to the information area 43. The amount of overlap from one area to the other may also provide an indication of whether or not the facial image security feature 60 is a valid feature or a forgery of the feature. Furthermore, in some embodiments, the image area 42 is at least partially overlapping with respect to the information area 43. In this embodiment, the facial image security feature 60 overlaps at least a portion of the overlapping between the image area 42 and information area 43.

The above description is intended to be illustrative, and not restrictive. For example, the above-described examples (or one or more aspects thereof) may be used in combination with others.

What is claimed is:

1. A secure document, comprising:
a front side;
a backside opposite the front side;
an image area provided on the front side, the image area having image content;
an information area provided on the front side, the information area having informational content; and
a security feature comprising a pattern of perforations at least partially overlapping the image area and at least partially overlapping the information area, the overlapping thereby binding the image content with the informational content;
wherein at least a portion of the pattern of perforations is laser-engraved on the front side, and wherein at least some of the perforations remove some of the image content provided on the front side and at least others of the perforations remove some of the informational content provided on the front side.

2. The document of claim 1, wherein the pattern of perforations is based, at least in part, on the image content of the image area.

3. The document of claim 2, wherein the pattern of perforations is provided on the front side.

4. The document of claim 2, wherein the security feature comprises a mirrored image from the image area.

5. The document of claim 1, wherein the pattern of perforations is provided at least partially on the front side and at least partially on the backside.

6. The document of claim 1, wherein the pattern of perforations overlaps the image area and the information area in equal proportions.

7. The document of claim 1, wherein the pattern of perforations overlaps the image area and the information area in non-equal proportions.

8. The document of claim 1, wherein the pattern of perforations is based, at least in part, on the informational content of the information area and the informational content describes a person portrayed in the image area.

9. The document of claim 1, wherein the image area is non-overlapping with respect to the information area.

10. The document of claim 1, wherein the image area at least partially overlaps the information area, and wherein the security feature overlaps at least a portion of the overlap between the image area and information area.

11. The document of claim 1, wherein the image content is printed onto the front side and the informational content is printed onto the front side.

12. A method of manufacturing a secure document, the method comprising:
creating an image area on a front side of the secure document by printing an image of a holder onto the front side;
creating an information area on the front side of the secure document by printing information that describes the holder onto the front side; and
laser-engraving a security feature including an image of the holder comprised of a pattern of perforations that overlap at least some of the image area and overlap at least some of the information area, wherein at least a portion of the pattern of perforations is laser-engraved on the front side, and wherein at least some of the perforations remove some of the image of the holder printed on the front side and at least others of the perforations remove some of the information that describes the holder printed on the front side.

13. The method of claim 12, wherein the pattern of perforations is provided at least partially on the front side and at least partially on a back side of the secure document.

14. The method of claim 12, wherein the image area is adjacent to, but not overlapping with, the information area.

15. An identification document comprising:
a first facial image provided as a first pattern of perforations formed in a substrate of the identification document;
first additional information corresponding to a holder of the identification document, the additional information provided as a second pattern of perforations formed in the substrate of the identification document; and
a second facial image, wherein the first facial image, the first additional information, or both the first facial image and the first additional information at least partially overlaps with the second facial image;
wherein the first additional information corresponds to a birthdate of the holder and at least partially overlaps with the first facial image.

16. An identification document comprising:
a first facial image provided as a first pattern of perforations formed in a substrate of the identification document;
first additional information corresponding to a holder of the identification document, the additional information provided as a second pattern of perforations formed in the substrate of the identification document; and
second additional information corresponding to the holder, the second additional information provided as a third pattern of perforations formed in the substrate of the identification document;
wherein the first additional information corresponds to at least one of: an age of the holder; a driver's license class or certification; an identification of membership in a professional organization; a professional license number; permission(s) information; a security clearance level; or any combination thereof.

17. The identification document of claim 16, wherein:
the second additional information corresponds to another one of: an age of the holder; a driver's license class or certification; an identification of membership in a professional organization; a professional license number; permission(s) information; or a security clearance level;
the first additional information and the second additional information at least partially overlap with the first facial image; and
the identification document further comprises a second facial image, wherein the first facial image, first additional information, and second additional information at least partially overlap with the second facial image.

* * * * *